(12) United States Patent
Chaudhari et al.

(10) Patent No.: US 6,195,146 B1
(45) Date of Patent: *Feb. 27, 2001

(54) TILTED LIQUID CRYSTAL ALIGNMENT PRODUCED BY ION BEAM TREATMENT ON THE ALIGNMENT LAYER USING A VOLTAGE LESS THAN 200V

(75) Inventors: Praveen Chaudhari, Briarcliff Manor; James Andrew Lacey, Mahopac; Shui-Chih Alan Lien, Briarcliff Manor, all of NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/067,574

(22) Filed: Apr. 28, 1998

Related U.S. Application Data

(63) Continuation-in-part of application No. 08/644,884, filed on May 10, 1996, now Pat. No. 5,770,826.

(51) Int. Cl.[7] .................................................. G02F 1/1337
(52) U.S. Cl. ............................................. 349/124; 349/126
(58) Field of Search ..................................... 349/124, 126; 204/157.15, 157.63, 157.6

(56) References Cited

U.S. PATENT DOCUMENTS 5,770,826 * 6/1998 Chaudhauri et al. ................ 349/124

* cited by examiner

Primary Examiner—Walter J. Malinowski
(74) Attorney, Agent, or Firm—David M. Shofi

(57) ABSTRACT

A liquid crystal display cell is includes a first substrate; a second substrate; a liquid crystal layer of liquid crystal molecules disposed between the first substrate and the second substrate; a first alignment layer disposed between the first substrate and the liquid crystal layer; and a second alignment layer disposed between the second substrate and the liquid crystal layer; wherein a surface of at least one alignment layer is bombarded by a particle beam of an adjustable energy using a voltage less than 200 V so that the liquid crystal molecules proximate the surface are induced to a predetermined pretilt angle.

18 Claims, 4 Drawing Sheets

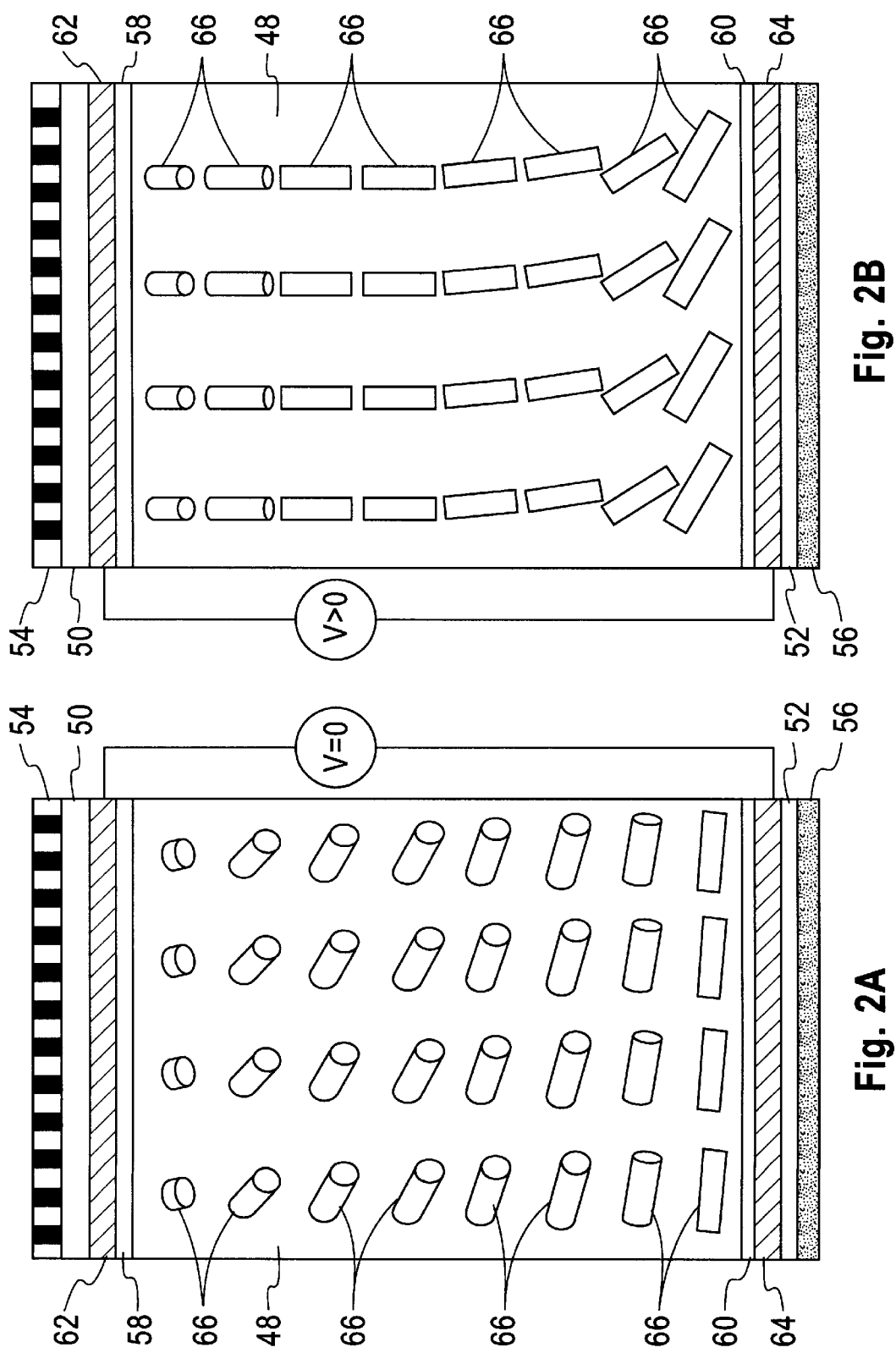

TILTED LIQUID CRYSTAL ALIGNMENT PRODUCED BY ION BEAM TREATMENT ON THE ALIGNMENT LAYER USING A VOLTAGE LESS THAN 200V

CROSS REFERENCE TO RELATED APPLICATIONS

This is a continuation-in-part of U.S. patent application Ser. No. 08/644,884 entitled, "ATOMIC BEAM ALIGNMENT OF LIQUID CRYSTALS," filed May 10, 1996, now U.S. Pat. No. 5,170,826 the teaching of which is incorporated herein by reference.

FIELD OF THE INVENTION

The present invention is directed to liquid crystal displays. Specifically, the present invention is directed to liquid crystal displays having at least one alignment layer which is exposed to a particle beam, such as an atomic or ion beam, so that the molecules of the liquid crystal material have a proper pretilt characteristic to form a liquid crystal display cell.

BACKGROUND OF THE INVENTION

Aligned liquid crystals are widely used in flat panel display technology. They are aligned by inducing anisotropy on the surface of a substrate. This surface is usually a polymer layer such as polyimide, coated on a glass substrate, as discussed in D.-S. Seo, H. Matsuda, J. Ishizaki, Y. Lamura and S. Kobayashi, SID Digest 1993, p. 953. Conventionally, there are a number of ways of introducing anisotropy on the surface. They include rubbing (see O. Kehmann (1906) and P. Chatelain (1943), cited by P. G. deGennes and J. Prost, "The Physics of Liquid Crystals," Clarendon Press, Oxford (1993) p. 109, 161), stretching a polymer (as discussed in H. Aoyama, Y. Yamazaki, M. Matsuura, H. Mada and S. Kobayashi, Mol. Cryst. Liq. Cryst. 72, 127 (1981)), a Langmuir-Boldgett film (see H. Ikeno, A. Oshaki, M. Nitto, N. Ozaki, Y. Yokoyama, K. Kakaya and S. Kobayashi, Jpn. J. Appl. Phys., 27, L475, (1988)), a grating structure produced by microlithography (see M. Nakamura and M. Ura, J. Appl. Phys., 52, 210 (1981)), oblique angle deposition of SiOx (see J. Ienuing, Appl. Phys. Lett., 21, 173 (1982)) and polarized UV radiation of polymer films (see M. Schadt, K. Suhmitt, V. Kozinkov and V. Chiqvinov, Jpn. J. Appl. Phys., 31, 2155 (1992)).

Most of these methods are impractical due to their complexity and/or cost for mass production. The pervasive method used in aligning liquid crystal displays available on the market today is the mechanical rubbing treatment (with, for example, a velvet cloth) of a polyimide film which is coated on the substrate. As discussed in S. Kobayashi and Y. Iimura, SPIE, 2175, 123 (1994), this method has several drawbacks. First, debris is left by the cloth during the rubbing process, damaging an otherwise clean room environment. Second, the vigorous rubbing may damage (e.g. scratch) the structure of the cell. Third, electrostatic discharging may influence the electronic circuitry below the thin polyimide film. Fourth, stability and consistency of pretilt angle are difficult to achieve and control. Finally, rubbing, being a macroscopic process, does not readily lend itself to aligning liquid crystals in different directions at the spatial size of a pixel, which is usually of the order of a hundred micrometers. This local alignment is desirable to obtain a multidomain structure, which significantly increases the angle of viewing of the display. The limited angle of viewing of current liquid crystal displays is one of the limitations of this technology.

It is an object of the present invention to provide a liquid crystal display cell produced by an improved method of providing a characteristic to a surface to which liquid crystal molecules align.

It is another object of the present invention to provide a liquid crystal display cell with such characteristic provided by using a particle beam, such as an atomic or ion beam.

SUMMARY OF THE INVENTION

The present invention provides liquid crystal display cells treated by a new non-contact method of aligning liquid crystals. These cells circumvent the problems posed by cells produced using the prior art methods of alignment, including the rubbing technique.

An aspect of the present invention is a liquid crystal display cell with an alignment layer or surface on which is generated an alignment direction by directing a particle beam at the alignment surface, wherein the particle beam is directed at the surface at an adjustable energy, at an adjustable angle with respect to the alignment surface and at an adjustable time to adjust the pretilt angle of a liquid crystal molecule with respect to the alignment surface.

The advantages of atomic beam induced alignment over the other alignment techniques are as follows. First, no contact is necessary for alignment. Second, a low energy beam ensures that only the surface layers are affected so that the number of radicals induced by broken bonds are a minimum This avoids charge build up when a voltage is applied across a liquid crystal cell. Third, large area uniform and parallel beams can be readily obtained. This is a problem with oblique deposition of SiOx. Fourth, atomic beams are well known to the electronics manufacturing community and are compatible with a clean room environment. Finally, atomic beams can be used to align both surfaces of a thin polymer film, which is self-supporting.

A liquid crystal display cell is provided including a first substrate; a second substrate; a liquid crystal layer of liquid crystal molecules disposed between the first substrate and the second substrate; a first alignment layer disposed between the first substrate and the liquid crystal layer; and a second alignment layer disposed between the second substrate and the liquid crystal layer; wherein a surface of at least one alignment layer is bombarded by a particle beam of an adjustable energy using a voltage less than 200 V so that the liquid crystal molecules proximate the surface are induced to a predetermined pretilt angle.

Preferably, the alignment layers comprise polymer films which are coated on the substrates. For homeotropic cell design, the film can be formed of homeotropic type material or, preferably, a homeotropic polyimide polymer film which is coated on the substrate. One or both alignment layers can have the film.

For homogeneous cell design, the liquid crystal can be formed of a homogeneous type material, preferably comprising twisted nematic liquid crystal molecules. One or both alignment layers can have a homogeneous polyimide film which is coated on the respective substrate.

Preferably, the particle beam is a beam of ion or neutral particles. The particle beam can be a beam of argon or oxygen particles. The particle beam can be an atomic beam, an ion beam, a molecular beam, an electron beam or an elementary beam.

It is preferable that the liquid crystal display be treated by a particle beam directed at an adjustable angle with respect to the surface of at least one of the alignment layers and at an adjustable time to adjust the pretilt angle of the liquid crystal molecules with respect to the surface of at least one of the alignment layers to which the liquid crystal molecules are aligned.

Preferably, the liquid crystal display cell is treated by a particle beam having a value of the adjustable energy, a value of the adjustable angle and a value of the adjustable time to result in the particle beam interacting only within a distance from the surface sufficient to result in an alignment direction but insufficient to introduce a substantial number of defects at or near the surface. The defects are, preferably, charge stored in the surface. The value of the adjustable energy is, preferably, greater than 25 eV. The value of the adjustable angle should range from about 0° to about 90°. Finally, the adjustable time preferably varies from five seconds to a few minutes.

BRIEF DESCRIPTION OF THE DRAWINGS

Further objects, features, and advantages of the present invention will become apparent from a consideration of the following detailed description of the invention when read in conjunction with the drawing figures in which:

FIG. 2(a) is a diagram of a cross-section of a homogeneous liquid crystal cell of the present invention where no voltage is applied to its conductors;

FIG. 2(b) is a diagram of the cross-section of the homogeneous liquid crystal cell of the present invention where a voltage is applied to its conductors;

DETAILED DESCRIPTION

Figure 1:
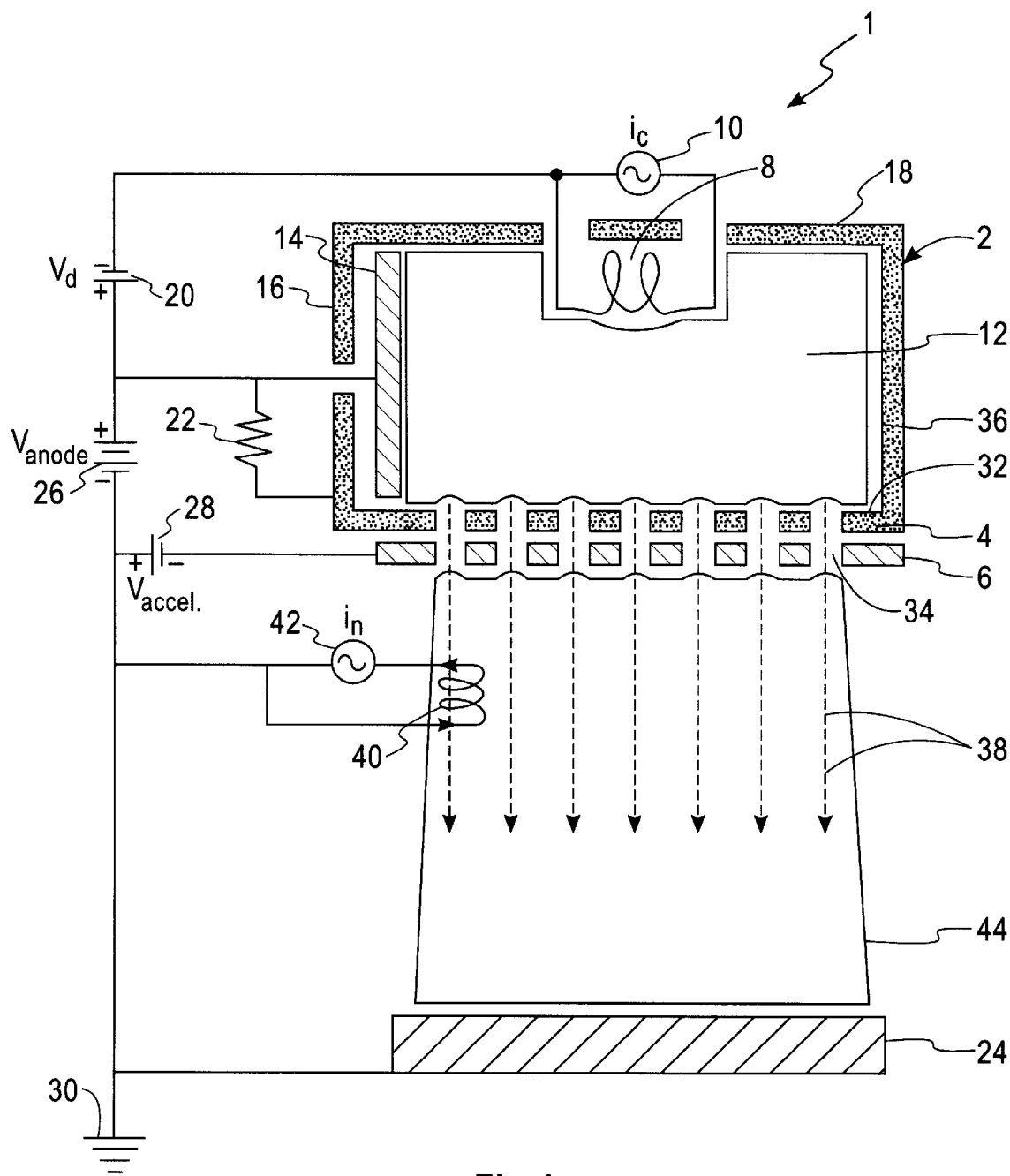
FIG. 1 is a schematic drawing of the ion beam system used to treat the alignment layers of the liquid crystal display cells of the present invention.

FIG. 1 is a schematic of the physical and electrical configuration of a preferred ion source for the ion beam system 1 used to produce the liquid crystal cell of the present invention. The principals of operation of the system are best understood by realizing that an ion source consists of three regions. Ions are generated in the discharge plasma region 12, accelerated through the extraction region 6 and travel through the beam plasma region 44.

Ions are generated in the discharge plasma region 12 by electron bombardment of neutral gas atoms. Electrons are emitted by a hot filament cathode 8 (driven by a current source $i_c$ 10) and accelerated by a potential difference, $V_d$ 20, between the cathode 8 and the anode 14. Preferably, a low energy beam of Argon ions is used to bombard the surface of a polyimide film layer 24. The Argon beam produces directional alignment when the beam is at an angle other than perpendicular to the surface. Because neutral beams of energetic particles can also cause damage of the polyimide resulting in broken bonds which provide a deleterious time dependent response in the liquid crystal when a voltage is applied to operate the display, it is highly desirable to use a low energy beam of energies comprising greater than 25 volts, rather than the hundreds of volts described in the literature (see, e.g., U.S. Pat. No. 5,030,322, issued July 1991 to Shimada et al. and Japanese Patent No. JP 3,217,823 issued August 1991). These low energy beams modify the surface layer sufficiently to induce alignment without any measurable degradation.

This voltage $V_d$ 20 is typically about 40V, which is several times higher than the Argon ionization voltage of 15.8 eV, and is used to establish a glow discharge. Before the discharge starts, the source body 2 is at the anode 14 potential. After the discharge starts, however, the connecting resistor 22 allows the source body 2 and the screen grid 4 to float to the cathode potential, directing the discharge current to the anode. The discharge plasma 12 establishes itself between the cathode 8, the anode 14, the chamber walls 16, 18, 32, 36 and the screen grid 4.

To extract the ion beam from the discharge plasma, the anode voltage, $V_{anode}$ 26, is raised to a positive voltage above ground. Raising the anode potential increases the plasma potential to nearly the same value. Thus, any ion leaving the discharge plasma and striking the grounded substrate or alignment surface 24 arrives with the energy determined by the anode potential. The extraction region 6 is held at a negative potential and the ions pass through the apertures 34 in the accelerator grid, not shown, without striking it and form a collimated beam 38, eventually striking the alignment surface 24 which is held at ground potential 30.

The incident angle of the ion beam to the substrate surface can be set from 5° to 85°. The energy of the ion beam varies from 25 eV to 200 eV. The bombardment time can be from 5 seconds to a few minutes.

Since the substrates used are insulating, when the ion beams hit the substrates, there is no current path available for the electron flow to meet the incoming flux of positive ions and the insulating surface would charge positive. To eliminate this charging, a hot filament or neutralizer 40 (with current source $i_n$ 42) is immersed in the collimated beam 44 which adequately supplies electrons to any region of the beam or the substrate surface which would charge positive.

The ion source for the ion beam system used to produce the liquid crystal cell of the present invention is commercially available and the accelerating voltage in this source could be varied from 75V to 500V. The current density, or the number of ions, per square cm can be approximately 100–500 µA per sq. cm. The substrate, which is bombarded with the atomic beam can be made of glass on which indium tin oxide and polyimide films had been deposited. Substrates containing thin film transistors covered by a polyimide film can also be used. A mylar film, which is self-supporting can be used. These implementations are exemplary only and should not be construed as limiting.

After exposure to ion beams, a pair of glass plates can be assembled together with a five micron spacer. The space between the two plates is preferably evacuated and subsequently filled with a liquid crystal. The liquid crystal is aligned by the atomic beam in much the same way that rubbing by a cloth does so.

FIG. 2(a) illustrates an example of a homogeneous liquid crystal cell (also referred to as a twisted nematic type cell) according to the present invention, to which no voltage is applied. Liquid crystal 48 is disposed between the two substrates 50 and 52. The substrates can be formed of glass, quartz, silicon base, plastic or any other suitable material. Transparent conductor 62 and alignment layer 58 are positioned between substrate 50 and the liquid crystal 48 while transparent conductor 64 and alignment layer 60 are positioned between substrate 52 and the liquid crystal 48. The alignment layers can be polyimide films which are coated on the substrates. Finally, polarizers 54 and 56 are preferably located on the outside surfaces of substrates 50 and 52, respectively.

The liquid crystal molecules 66 near the boundary of the alignment layers 58 and 60, which were treated in the manner discussed hereinabove with reference to FIG. 1, are aligned such that the long axes of the molecules 66 are almost parallel to the alignment surfaces. Due to the alignment layers 58 and 60, the molecules have a small pretilt angle (one to ten degrees from the alignment surfaces). Furthermore, the molecules 66 near the border of the alignment layer 60 are rotated, typically 90 degrees, with respect to the molecules 66 near the alignment layer 58.

FIG. 2(b) illustrates the same homogeneous liquid crystal cell when a voltage, greater than zero, is applied between transparent conductors 62 and 64. In this case, due to the pretilt angle of the molecules created by the ion beam treatment of the alignment layers 58 and 60, the molecules 66 are caused to be oriented in a direction substantially parallel to the electric field created. The illustrated positions of the molecules 66 in FIG. 2(b) are actually achieved only after the molecules gradually rotate from their positions in FIG. 2(a) as the voltage increases.

Figure 3A:
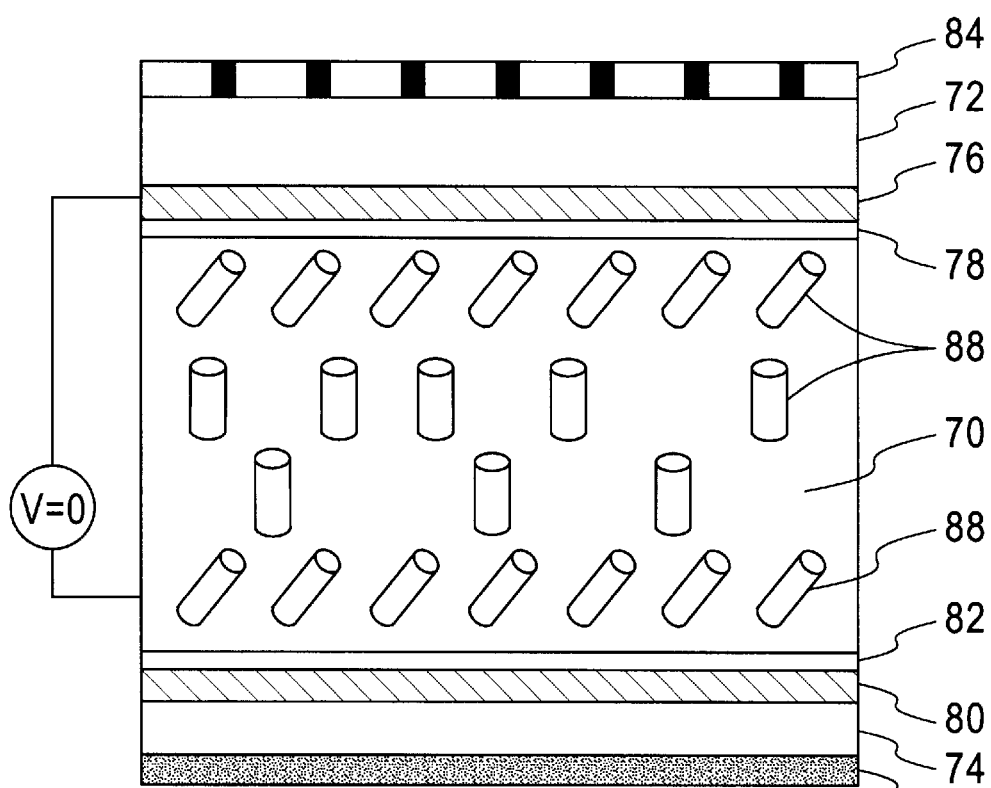
FIG. 3(a) is a diagram of a cross-section of a homeotropic liquid crystal cell of the present invention where no voltage is applied to its conductors.

FIG. 3(a) illustrates an example of a homeotropic type liquid crystal cell according to the present invention to which no voltage is applied. Liquid crystal 70, preferably a negative dielectric anisotropic liquid crystal, is disposed between the two substrates 72 and 74. As described hereinabove, the substrates can be formed from a number of suitable materials. A transparent conductor 76 and an alignment layer 78 are positioned between the substrate 72 and the liquid crystal 70 while a transparent conductor 80 and an alignment layer 82 are positioned between substrate 74 and liquid crystal 70. Preferably, the alignment layers are homeotropic alignment films coated on the substrates. Examples of these film materials are Nissan polyimide SE-1211 and JSR polyimide JSR-S688. Finally, polarizers 84 and 86 are preferably located on the outside surfaces of substrate 72 and 74, respectively.

Before being treated in the manner discussed hereinabove with reference to FIG. 1, the liquid crystal molecules 88 near the boundary of the alignment layers 78 and 82 are aligned such that the long axes of the molecules are perpendicular to the alignment surfaces. After bombardment by the ion beam, the alignment layers 58 and 60 cause the molecules to have a small pretilt angle (one-half to fifteen degrees from the alignment surface normal). Thus, the ion beam treated homeotropic alignment film achieves the tilted homeotropic liquid crystal alignment.

Figure 3B:
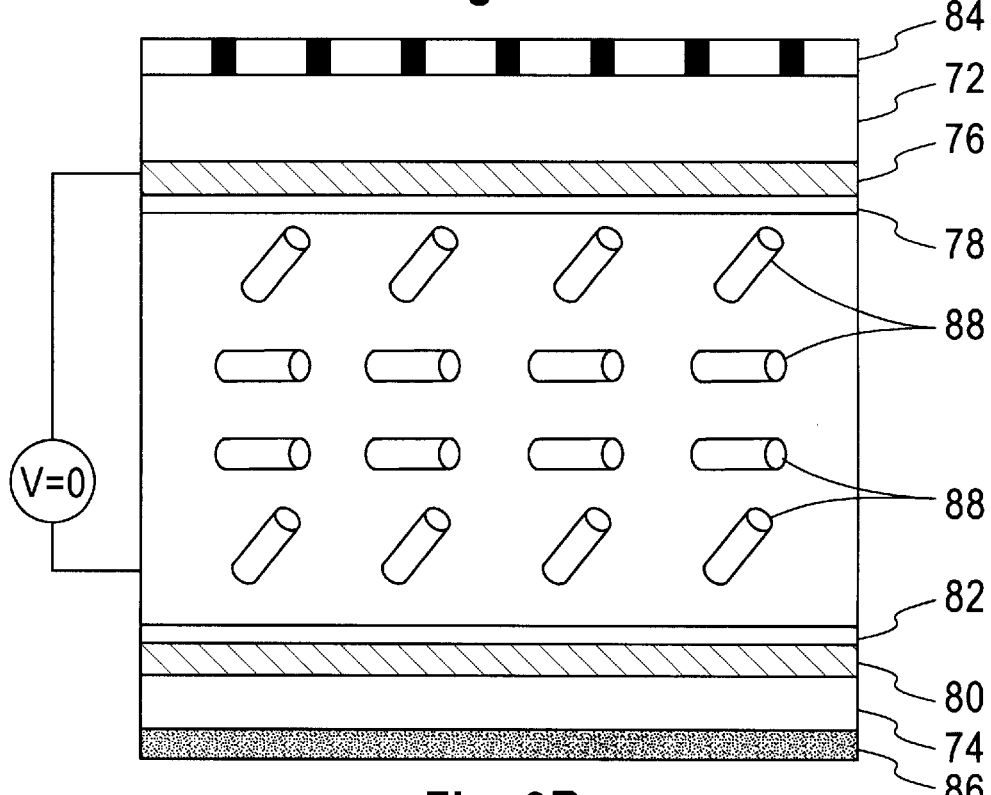
FIG. 3(b) is a diagram of the cross-section of the homeotropic liquid crystal cell of the present invention where a voltage is applied to its conductors.

FIG. 3(b) illustrates the same homeotropic liquid crystal cell when a voltage is applied between the transparent conductors 76 and 80. In this case, the molecules 88 are caused to be oriented in a direction substantially perpendicular to the electric field created. Again, the illustrated positions of the molecules 88 are actually achieved only after the molecules gradually rotate from their positions in FIG. 3(a) as the voltage increases.

In either case, the alignment caused by the ion beam treatment is strong. The tilt angle can be determined as a function of the angle, time, and energy of the beam. For active matrix liquid displays, it is desirable to have the pretilt angle be larger than a few degrees. The operation of a homeotropic liquid crystal display and tilt angle are described in U.S. application Ser. No. 08/960,826, filed Oct. 30, 1997 and assigned to the assignee of the present invention, the teaching of which is incorporated hereby by reference. The operation of a homogeneous liquid crystal display and tilt angle are described in U.S. Pat. No. 5,623,354, issued Apr. 22, 1997 to the assignee of the present invention, the teaching of which is incorporated herein by reference.

Figure 4:
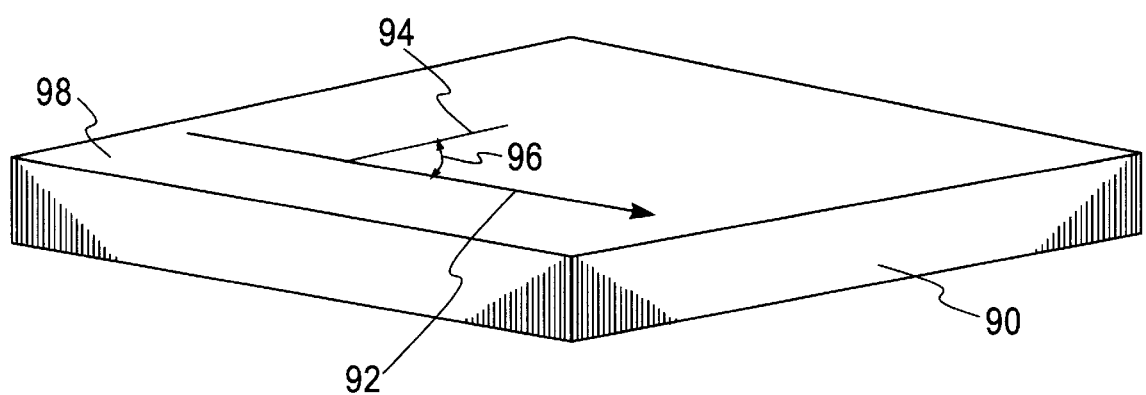
FIG. 4 schematically shows the pretilt angle of a liquid crystal molecule in a liquid crystal display cell of the present invention.

FIG. 4 schematically shows substrate 90 of a liquid crystal cell of the present invention with the alignment directory 92 formed by the ion beam treatment with a liquid crystal molecule schematically shown as 94 which make an angle 96 with respect to surface 98 of substrate 90. Angle 96 is the pretilt angle created by the ion beam treatment.

From testing, it is clear that the pretilt angle in the liquid crystal display cells of the present invention satisfies the needs of display technology and that its variation with atomic beam parameters such as voltage and current are controllable.

Test results also show that the atomic beam alignment technique can be used to align liquid crystal displays according to the present invention provided the accelerating voltage is kept low. For polyimide and argon ions, this is below 200V.

The liquid crystal display cells of the present invention can be used for direct view TFT LCDs or projection displays. They can be implemented in transmissive as well as reflective type displays.

While the present invention has been described with respect to preferred embodiments, numerous modifications, changes, and improvements will occur to those skilled in the art without departing from the spirit and scope of the invention.

We claim:

1. A liquid crystal display cell comprising:
    a first substrate;
    a second substrate;
    a liquid crystal layer of liquid crystal molecules disposed between the first substrate and the second substrate;
    a first alignment layer disposed between the first substrate and the liquid crystal layer; and
    a second alignment layer disposed between the second substrate and the liquid crystal layer;
    wherein a surface of at least one alignment layer is bombarded by a particle beam of an adjustable energy using a voltage less than 200V so that the liquid crystal molecules proximate the surface are induced to a predetermined pretilt angle.

2. The liquid crystal display cell of claim 1 wherein the first and second alignment layers comprise a polymer film which is coated on the first and second substrate, respectively.

3. The liquid crystal display cell of claim 2 wherein the liquid crystal layer comprises homeotropic type material.

4. The liquid crystal display cell of claim 3 wherein the first alignment layer comprises a homeotropic polyimide polymer film which is coated on the first substrate.

5. The liquid crystal display cell of claim 4 wherein the second alignment layer comprises a homeotropic polyimide film which is coated on the second substrate.

6. The liquid crystal display cell of claim 2 wherein the liquid crystal layer comprises homogeneous type material.

7. The liquid crystal display cell of claim 6 wherein the homogeneous type material comprises twisted nematic liquid crystal molecules.

8. The liquid crystal display cell of claim 7 wherein the first alignment layer comprises a homogeneous polyimide film which is coated on the first substrate.

9. The liquid crystal display cell of claim 8 wherein the second alignment layer comprises a homogeneous polyimide film which is coated on the second substrate.

10. The liquid crystal display cell of claim 1 wherein the particle beam is a beam of particles selected from the group consisting of ions and neutral particles.

11. The liquid crystal display cell of claim 10 wherein the particle beam is a beam of particles selected from the group consisting of argon and oxygen.

12. The liquid crystal display cell of claim 10 wherein the particle beam is selected from the group consisting of atomic beams, ion beams, molecular beams, electron beams and elementary beams.

13. The liquid crystal display cell of claim 1 wherein the particle beam is directed at an adjustable angle with respect to the surface of the at least one alignment layer and at an adjustable time to adjust the pretilt angle of the liquid crystal molecules with respect to the surface of the at least one alignment layer to which the liquid crystal molecules are aligned.

14. The liquid crystal display cell of claim 13 wherein the particle beam has a value of the adjustable energy, a value of the adjustable angle and a value of the adjustable time to result in the particle beam interacting only within a distance from the surface sufficient to result in an alignment direction but insufficient to introduce defects in the surface.

15. The liquid crystal display cell of claim 14 wherein the defects are charge stored in the surface.

16. The liquid crystal display cell of claim 14 wherein the value of the adjustable energy is greater than 25 eV.

17. The liquid crystal display cell of claim 14 wherein the value of the adjustable angle is from about 0° to about 90°.

18. The liquid crystal display cell of claim 14 wherein the adjustable time varies from five seconds to a few minutes.

* * * * *